(12) United States Patent
Kesarwani

(10) Patent No.: US 10,386,882 B2
(45) Date of Patent: Aug. 20, 2019

(54) CONTROL CIRCUIT

(71) Applicant: Allegro MicroSystems, LLC, Worcester, MA (US)

(72) Inventor: Kapil Kesarwani, Bedford, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 1 day.

(21) Appl. No.: 15/487,746

(22) Filed: Apr. 14, 2017

(65) Prior Publication Data

US 2018/0299919 A1 Oct. 18, 2018

(51) Int. Cl.
| | |
|---|---|
| *H02M 3/157* | (2006.01) |
| *G05F 3/26* | (2006.01) |
| *H02M 3/158* | (2006.01) |
| *H02M 1/00* | (2006.01) |

(52) U.S. Cl.
CPC .............. *G05F 3/26* (2013.01); *H02M 3/158* (2013.01); *H02M 3/157* (2013.01); *H02M 2001/0022* (2013.01)

(58) Field of Classification Search
CPC . H02M 2001/0003; H02M 2001/0016; H02M 3/156; H02M 3/157; H02M 3/07; H02M 2001/0022; G05F 3/267; G05F 3/26; G05F 3/262; H03K 3/017
See application file for complete search history.

(56) References Cited

U.S. PATENT DOCUMENTS

| | | | |
|---|---|---|---|
| 8,115,459 B2 | 2/2012 | Prodić et al. | |
| 9,621,041 B2 | 4/2017 | Sun et al. | |
| 2007/0112443 A1 | 5/2007 | Latham et al. | |
| 2009/0121697 A1* | 5/2009 | Aiura | H02M 3/156 323/286 |
| 2010/0052627 A1* | 3/2010 | Otsuka | H02M 3/156 323/225 |
| 2010/0207594 A1 | 8/2010 | Davoudi et al. | |
| 2011/0316511 A1* | 12/2011 | Wang | H02M 3/156 323/285 |
| 2013/0057240 A1 | 3/2013 | Zambetti et al. | |

(Continued)

OTHER PUBLICATIONS

U.S. Appl. No. 15/453,039, filed Mar. 8, 2017, Raval et al.

(Continued)

*Primary Examiner* — Adolf D Berhane
*Assistant Examiner* — Shahzeb K Ahmad
(74) *Attorney, Agent, or Firm* — Daly, Crowley, Mofford & Durkee, LLP

(57) ABSTRACT

A control circuit for generating a feedforward control signal based on an input voltage includes a divider coupled to the input voltage to generate a divided voltage and a first buffer responsive to the divided voltage to generate a buffered voltage at an output of the first buffer. The control circuit also includes a first capacitor coupled to the first buffer output and configured to generate a feedforward current when there is a variation in the input voltage and a current mirror circuit including a current mirror output node at which a current mirror output voltage indicative of the input voltage variation is generated. A digitizing circuit is responsive to the current mirror output voltage to generate the feedforward control signal. A DC-DC converter and a method for generating a feedforward control signal based on an input voltage are also provided.

22 Claims, 3 Drawing Sheets

(56) References Cited

U.S. PATENT DOCUMENTS

| | | |
|---|---|---|
| 2013/0235628 A1 | 9/2013 | Dong et al. |
| 2014/0036545 A1 | 2/2014 | Reddy |
| 2014/0125306 A1* | 5/2014 | Babazadeh ............... G05F 5/00 323/285 |
| 2014/0210359 A1 | 7/2014 | Raval et al. |
| 2015/0188417 A1* | 7/2015 | Hou ........................ H02M 3/04 323/234 |
| 2017/0126119 A1* | 5/2017 | Bernardon .............. H02M 1/08 |
| 2017/0264185 A1* | 9/2017 | Karlsson ............... H02M 3/157 |
| 2017/0294837 A1* | 10/2017 | Li ........................ H02M 3/156 |

OTHER PUBLICATIONS

Hagen et al. "Applying Digital Technology to PWM Control-Loop Designs", (http://www.ti.com/download/trng/docs/seminar/Topic_7_Hagen.pdf), 28 pages.

Pasternak et al. "Design Considerations for Digitally Controlled Buck Converters with Large Input Transients", IEEE, Apr. 2016, 7 pages.

Patella et al. "High-Frequency Digital PWM Controller IC for DC—DC Converters", IEEE, Transactions on Power Electronics, vol. 18, No. 1, Jan. 2003, 9 pages.

Notice of Allowance dated Nov. 19, 2018 for U.S. Appl. No. 15/876,641; 9 pages.

\* cited by examiner

CONTROL CIRCUIT

CROSS REFERENCE TO RELATED APPLICATIONS

Not Applicable.

STATEMENT REGARDING FEDERALLY SPONSORED RESEARCH

Not Applicable.

FIELD

This disclosure relates generally to control circuits, and more particularly, to a digital control circuit for generating a feedforward control signal for a DC-DC converter.

BACKGROUND

As is known, DC-DC converters, such as buck converters, boost converters, and other converter types, often use control circuitry and techniques to control a level of one or more signals of the converters (e.g., voltage output signals). The control circuitry can be implemented with digital and/or analog circuitry and techniques. In digital control, control signals generated by feedback and/or feedforward control circuitry of a converter may be used to generate a duty cycle word indicative of a required duty cycle for generating a desired converter output voltage. The duty cycle word may be converted into a voltage control signal for controlling a power stage of the converter from which the converter output voltage is generated.

SUMMARY

Described herein are concepts, systems, circuits and techniques related to a control circuit for generating a feedforward control signal based on an input voltage. A DC-DC converter and a method for generating a feedforward control signal based on an input voltage are also provided. In one aspect of the concepts described herein, a control circuit for generating a feedforward control signal includes a divider coupled to an input voltage to generate a divided voltage having a value that is a fraction of the input voltage. A first buffer is responsive to the divided voltage to generate a buffered voltage at an output of the first buffer. Additionally, a first capacitor is coupled to the first buffer output and configured to generate a feedforward current when there is a variation in the input voltage. A first current path of a current mirror circuit is coupled to the first capacitor and to a reference current source and a second current path of the current mirror circuit is coupled to the reference current source. A current mirror output voltage indicative of the input voltage variation is generated at a current mirror output node of the current mirror circuit. A digitizing circuit is responsive to the current mirror output voltage to generate the feedforward control signal.

The control circuit may include one or more of the following features individually or in combination with other features. A second capacitor may be coupled to the second current path of the current mirror, and the current mirror output voltage may be generated across the second capacitor. The first capacitor may have a first capacitance value and the second capacitor may have a second capacitance value that is different from the first capacitance value. The first and second capacitance values may be selected such that the current mirror output voltage changes at a substantially same rate as the input voltage. The first current path of the current mirror circuit may include a first transistor having a first terminal coupled to the first capacitor, a second, control terminal, and a third terminal coupled to a reference potential. The second current path of the current mirror circuit may include a second transistor having a first terminal coupled to the current mirror output node, a second, control terminal, and a third terminal coupled to the reference potential. The control terminal of the first transistor may be coupled to the control terminal of the second transistor.

The digitizing circuit may include a first comparator responsive to the current mirror output voltage and to a first threshold signal to generate a first comparison signal indicative of a negative transient of the input voltage when the current mirror output voltage is greater than the first threshold signal. The digitizing circuit may include a second comparator responsive to current mirror output voltage and to a second threshold signal to generate a second comparison signal indicative of a positive transient of the input voltage when the current mirror output voltage is less than the second threshold signal. The feedforward control signal may include configuration of the first comparison signal and the second comparison signal. The first threshold signal may have a first voltage value and the second threshold signal may have a second voltage value that is substantially different from the first voltage value.

The feedforward control signal may be coupled to a digital compensator of a DC-DC converter. The DC-DC converter may be a buck regulator. A reset circuit may be configured to periodically reset the current mirror output voltage to a predetermined level. The reset circuit may include a second buffer responsive to a third threshold signal to generate a reset signal to reset the current mirror output voltage. A switch may be coupled between an output of the second buffer and the second capacitor. The reset signal may be coupled to a control terminal of the switch. The switch may be closed to reset the current mirror output voltage after a predetermined number of cycles of a system clock signal.

In another aspect of the concepts described herein, a DC-DC converter includes a power stage responsive to an input voltage and to a voltage control signal and configured to generate a regulated output voltage having a level that varies in response to the voltage control signal. The DC-DC converter also includes a control circuit for generating the voltage control signal. The control circuit includes a feedforward path, feedback path, a digital compensator and a pulse width modulator. A first divider in the feedforward path is coupled to the input voltage to generate a first divided voltage having a value that is a fraction of the input voltage. Additionally, a buffer is responsive to the first divided voltage to generate a buffered voltage at an output of the buffer and a first capacitor is coupled to the buffer output and configured to generate a feedforward current when there is a variation in the input voltage. A first current path of a current mirror circuit is coupled to the first capacitor and to a reference current source, a second current path of the current mirror circuit is coupled to the reference current source, and a current mirror output voltage indicative of the input voltage variation is generated at an current mirror output node of the current mirror circuit. A digitizing circuit is responsive to the current mirror output voltage to generate the feedforward control signal.

A second divider in the feedback path of the control circuit is coupled to the regulated output voltage to generate a second divided voltage having a value that is a fraction of the regulated output voltage. Additionally, an error amplifier is responsive to the second divided voltage and to a reference voltage to generate an error voltage indicative of a difference between the second divided voltage and the reference voltage. Further, an ADC is responsive to the error voltage to generate a feedback control signal.

The digital compensator of the control circuit is responsive to the feedforward control signal and to the feedback control signal to generate a compensator signal. Additionally, the pulse width modulator of the control circuit is responsive to the compensator signal to generate the voltage control signal.

In a further aspect of the concepts described herein, a method for generating a feedforward control signal based on an input voltage in a control circuit includes dividing the input voltage to generate a divided voltage having a value that is a fraction of the input voltage. The method also includes generating a buffered voltage at an output of a buffer in response to the divided voltage and generating a feedforward current through a first capacitor coupled to the buffer output when there is a variation in the input voltage. The method additionally includes coupling a first current path of a current mirror circuit to the first capacitor and to a reference current source and a second current path of the current mirror circuit to the reference current source. The method further includes generating a current mirror output voltage indicative of the input voltage variation at an output node of the current mirror circuit in the second current path, the current mirror output voltage being generated in response to the feedforward current and to a reference current received from the reference current source. The method also includes generating the feedforward control signal in response to the current mirror output voltage.

In another aspect of the concepts described herein, a control circuit for generating a feedforward control signal based on an input voltage includes means for dividing the input voltage to generate a divided voltage having a value that is a fraction of the input voltage. The control circuit also includes a first buffer responsive to the divided voltage to generate a buffered voltage at an output of the first buffer and means for generating a feedforward current from the first buffer output when there is a variation in the input voltage. The control circuit additionally includes a current mirror circuit including a first current path coupled to a reference current source and to the means for generating the feedforward current and a second current path coupled to the reference current source. A current mirror output voltage indicative of the input voltage variation is generated at a current mirror output node of the current mirror circuit. The control circuit further includes means for generating the feedforward control signal in response to the current mirror output voltage.

The control circuit may include one or more of the following features individually or in combination with other features. The means for generating the feedforward control signal may include a first comparator responsive to the current mirror output voltage and to a first threshold signal to generate a first comparison signal indicative of a negative transient of the input voltage when the current mirror output voltage is greater than the first threshold signal. The means for generating the feedforward control signal may also include a second comparator responsive to current mirror output voltage and to a second threshold signal to generate a second comparison signal indicative of a positive transient of the input voltage when the current mirror output voltage is less than the second threshold signal. The feedforward control signal may include configuration of the first comparison signal and the second comparison signal. The first threshold signal may have a first voltage value and the second threshold signal may have a second voltage value that is substantially different from the first voltage value.

The feedforward control signal may be coupled to a digital compensator of a DC-DC converter. A reset circuit may be configured to periodically reset the current mirror output voltage to a predetermined level. The reset circuit may include a second buffer responsive to a third threshold signal to generate a reset signal to reset the current mirror output voltage.

BRIEF DESCRIPTION OF THE DRAWINGS

The foregoing features of the disclosure, as well as the disclosure itself may be more fully understood from the following detailed description of the drawings, in which.

DETAILED DESCRIPTION

Figure 1:
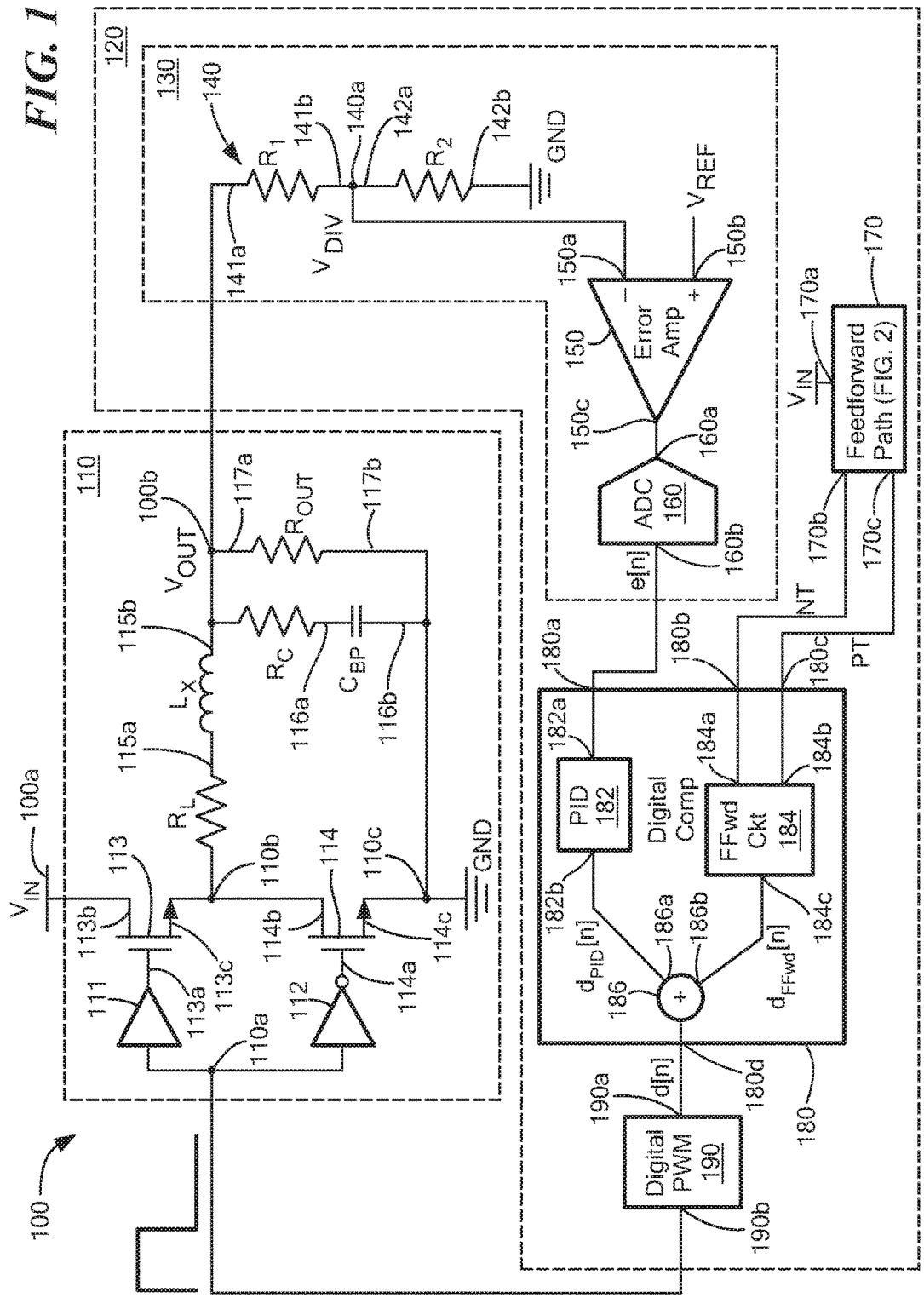
FIG. 1 is a block diagram of an example regulator circuit that includes a control circuit for generating a feedforward control signal.

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected. Embodiments of the present disclosure and associated advantages may be best understood by referring to the drawings, where like numerals are used for like and corresponding parts throughout the various views.

Referring now to FIG. 1, a simplified view of an example buck regulator circuit 100 which may be provided in a power management integrated circuit (IC), for example, is shown. The regulator circuit 100 (e.g., a voltage mode regulator) includes a power stage 110 and a control circuit 120 and has an input 100*a* at which an input or supply voltage $V_{IN}$ is received and an output 100*b* at which a regulated output voltage $V_{OUT}$ (e.g., a "stepped-down" output voltage) is generated.

The power stage 110, which is illustrative of one example configuration of a regulator power stage, includes a buffer 111, an inverter 112, a first transistor 113 (e.g., a first power switch) and a second transistor 114 (e.g., a second power switch). The power stage 110 also includes an output resistor $R_{out}$ and output filter (e.g., an LC filter) including an inductor $L_x$ and a capacitor $C_{BP}$. The inductor $L_x$ has a DC resistance $R_L$ and the capacitor $C_{BP}$ has an equivalent series resistance $R_c$, which are shown in the figure. In embodiments in which the buck regulator circuit 100 is provided in the form of an IC, it will be appreciated that various components may be integrated into the IC or may be external to the IC.

Transistors 113, 114 (e.g., field effect transistors (FETs)) are provided in a push-pull configuration in the illustrated embodiment, each having a corresponding first terminal 113*a*, 114*a* (e.g., a gate terminal) coupled to a node 110*a* (here, a control node) of power stage 110 at which a voltage control signal for controlling a voltage level of the output voltage $V_{OUT}$ is provided. The first terminals 113a, 114a of transistors 113, 114 are coupled to the node 110a via buffer 111 and inverter 112, respectively. Transistor 113 has a second terminal 113b (e.g., a drain terminal) coupled to regulator input 100a at which the input voltage or supply voltage $V_{IN}$ is provided and a third terminal 113c (e.g., a source terminal) coupled to a node 110b of power stage 110. Additionally, transistor 114 also has a second terminal 114b (e.g., a drain terminal) coupled to node 110b and a third terminal 114c (e.g., a source terminal) coupled to a node 110c of power stage 110, which node is coupled to a reference potential (here, GND).

Inductor $L_x$ has a first terminal 115a coupled to the node 110b and a second terminal 115b coupled to output voltage $V_{OUT}$ node 100b of power stage 110. Additionally, capacitor $C_{BP}$ has a first terminal 116a coupled to output node 100b and a second terminal coupled to node 110c of power stage 110, which node is coupled to GND. Further, output resistor $R_{out}$ has a first terminal 117a coupled to node 100b and a second terminal 117b coupled to GND node 110c.

The control circuit 120 (e.g., a voltage mode control circuit), which generates the voltage control signal received at node 110a of the power stage 110, as will be discussed further below, includes a feedback path 130 and a feedforward path 170. The control circuit 120 also includes a compensator 180 coupled to the feedback path 130 and to the feedforward path 170 and a digital Pulse Width Modulator (PWM) 190 coupled to the digital compensator 180.

The feedback path 130 includes a divider circuit 140, an error amplifier 150 and an analog-to-digital converter (ADC) 160. The divider 140 is coupled to regulator output 100b and includes a first resistor $R_1$ and a second resistor $R_2$. Resistor $R_1$ has a first terminal 141a coupled to the regulator output 100b and a second terminal 141b coupled to a node 140a (i.e., an intermediate node) of the divider circuit 140 at which a divided voltage $V_{DIV}$ is provided. The divided voltage $V_{DIV}$ has a value that is a fraction of the output voltage $V_{OUT}$ at the regulator output 100b. Resistor $R_2$ of the divider 140 has a first terminal 142a coupled to node 140a and a second terminal 142b coupled to a reference potential (here, GND).

The error amplifier 150 of the feedback path 130 is coupled to receive the divided voltage $V_{DIV}$ at a first input 150a (e.g., an inverting input) and a reference voltage $V_{REF}$ at a second input 150b (e.g., a non-inverting input) and is configured to generate an error voltage at an output 150c in response to a difference between the first amplifier input 150a and the second amplifier input 150b. Additionally, the ADC 160 of the feedback path 130 is coupled to receive the error voltage at an ADC input 160a and is configured to generate a converted digital signal (e.g., a binary word) e[n] at an ADC output 160b in response to the ADC input 160a. The converted digital signal e[n] corresponds to a feedback control signal of the feedback path 130 in the illustrated embodiment.

The feedforward path 170 of the control circuit 120, which may be referred to herein alternatively as the feedforward control circuit or simply control circuit 170, has a feedforward path input 170a coupled to the input voltage $V_{IN}$ received at input 100a of the regulator circuit 100. The feedforward path 170 is configured to generate a first feedforward signal PT indicative of a positive transient of the input voltage $V_{IN}$ at a first feedforward path output 170b in response to the feedforward path 170 detecting that the input voltage $V_{IN}$ experiences a positive transient (i.e., a voltage increase). Additionally, the feedforward path 170 is configured to generate a second feedforward signal NT indicative of a negative transient of the input voltage $V_{IN}$ at a second feedforward path output 170c in response to the feedforward path 170 detecting that the input voltage $V_{IN}$ experiences a negative transient (i.e., a voltage decrease).

The compensator 180 (e.g., a digital compensator) of the control circuit 120 is coupled to receive the feedback control signal e[n] at a first compensator input 180a. Additionally, the compensator 180 is coupled to receive the first feedforward signal PT at a second compensator input 180b when the feedforward path 170 detects that the input voltage $V_{IN}$ experiences a positive transient and to receive the second feedforward signal NT at a third compensator input 180c when the feedforward path 170 detects that the input voltage $V_{IN}$ experiences a negative transient. The compensator 180 is configured to generate a duty cycle word d[n] at a compensator output 180d in response to the compensator inputs 180a, 180b, and 180c. In general, the first feedforward signal PT will tend to cause the compensator output duty cycle word d[n] to reduce the duty cycle of the switches 113, 114 (in response to a positive input voltage variation or transient) and the second feedforward signal NT will tend to cause the compensator output duty cycle word d[n] to increase the duty cycle of the switches 113, 114 (in response to a negative input voltage variation or transient).

More particularly, in the illustrated embodiment the compensator 180 includes a proportional-integral-derivative (PID) controller 182, a feedforward duty cycle circuit 184 and a compensator output module 186. The PID controller 182 is coupled to receive the feedback control signal e[n] from the first compensator input 180a at a PID controller input 182a and is configured to generate a first duty cycle word $d_{PID}[n]$ associated with the feedback control signal e[n] at a PID controller output 182b. Additionally, the feedforward duty cycle circuit 184 is coupled to receive the first feedforward signal PT and the second feedforward signal NT from the second and third compensator inputs 180b, 180c at first and second feedforward circuit inputs 184a, 184b, respectively, and is configured to generate a second duty cycle word $d_{FFwd}[n]$ associated with the received first or second feedforward signals at a feedforward circuit output 184c. Further, the compensator output module 186, which includes a summing circuit in the illustrated embodiment and may include a subtractor circuit in other embodiments, for example, is coupled to receive the first duty cycle word $d_{PID}[n]$ at a first compensator output module input 186a and the second duty cycle word $d_{FFwd}[n]$ at a second compensator output module input 186b and is configured to generate a third duty cycle word d[n] as a combination of the first and second duty cycle words $d_{PID}[n]$, $d_{FFwd}[n]$. The third duty cycle word d[n] is provided to the compensator output 180d.

The digital PWM circuit 190 of the control circuit 120 is coupled to receive the duty cycle word d[n] (i.e., the third duty cycle word d[n]) generated by the compensator 180 at a PWM input 190a and is configured to generate a PWM, or voltage control signal at a PWM output 190b. The voltage control signal has a duty cycle based on the duty cycle word d[n].

Transistors 113, 114 of power stage 110 are each coupled to receive the voltage control signal or an inverted version of the voltage control signal at a corresponding input 113a, 114a and are switched on and off (i.e., between conducting and non-conducting states) in response to transitions of the voltage control signal. More particularly, power stage 110 is coupled to receive the voltage control signal at node 110a and is configured to generate two complementary transistor drive signals for controlling transistors 113, 114. It will be understood that the first and second transistor drive signals may be level shifted with respect to the voltage control signal at node 110a and may be processed to introduce a dead time during which neither transistor 113, 114 is on.

Figure 2:
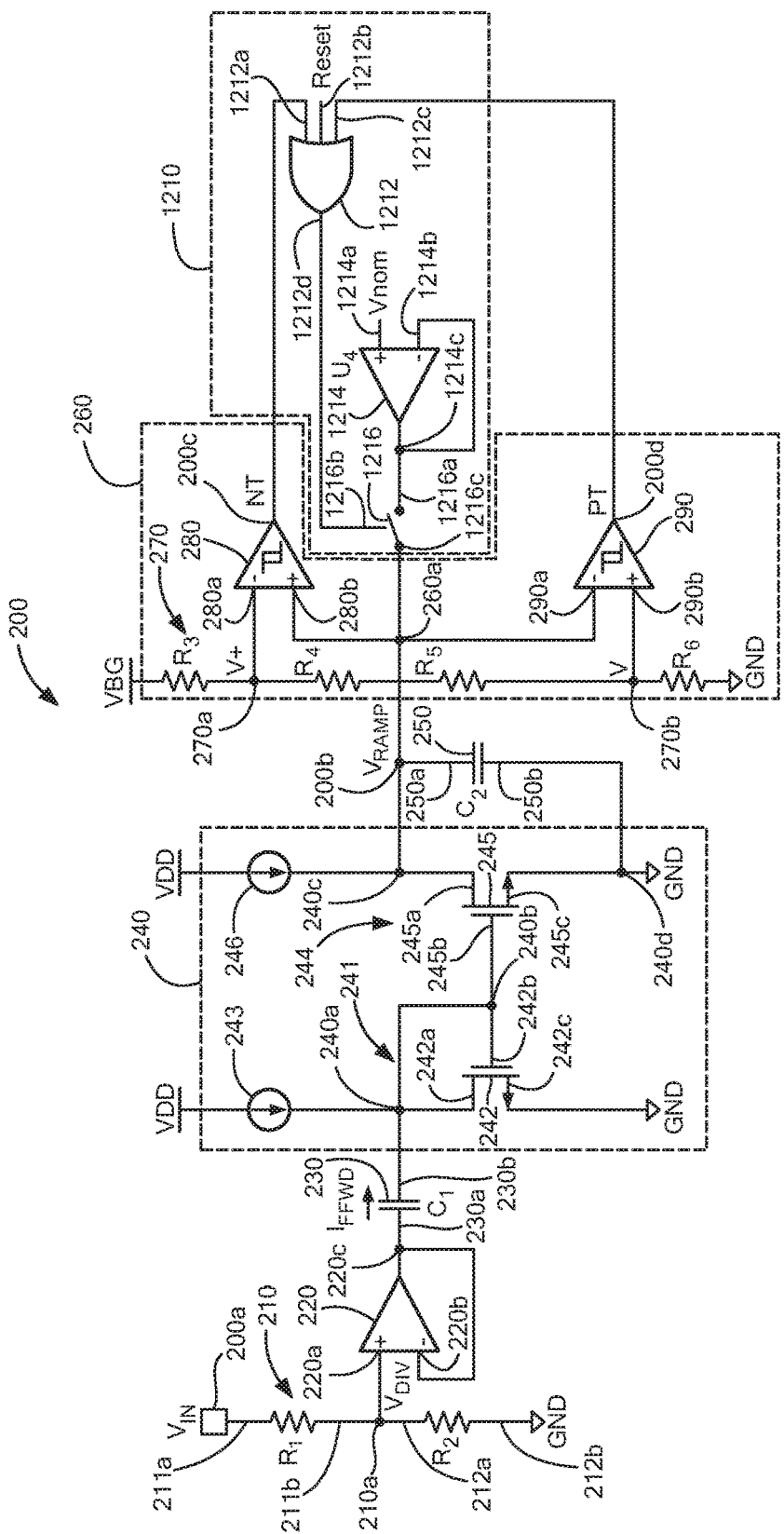
FIG. 2 is a block diagram of an example control circuit according to the disclosure that may be used in the regulator circuit of FIG. 1.

Referring now to FIG. 2, an example feedforward control circuit 200 for generating a feedforward control signal according to an embodiment of the disclosure is shown. The control circuit 200, which may provide the feedforward path 170 in the regulator circuit 100 of FIG. 1, includes a first divider 210, a first buffer 220, a first capacitor 230, a current mirror circuit 240 and a digitizing circuit 260 from which the feedforward control signal is generated. More particularly, the control circuit 200 receives an input voltage $V_{IN}$ that may be the same or similar to input voltage $V_{IN}$ of FIG. 1 at an input 200a of the control circuit 200 and generates a feedforward control signal based on the input voltage $V_{IN}$. In the example circuit 200, the feedforward control signal may take the form of a first control signal NT provided at a first feedforward output 200c and/or a second control signal PT provided at a second feedforward output 200d of the control circuit 200.

The first divider 210 of the control circuit 200 includes a first resistor $R_1$ and a second resistor $R_2$. Resistor $R_1$ has a first terminal 211a coupled to the input voltage $V_{IN}$ and a second terminal 211b coupled to a node 210a (i.e., an intermediate node) of the divider 210 at which a divided voltage $V_{Div}$ having a value that is a fraction of the input voltage $V_{IN}$ is generated. Additionally, resistor $R_2$ has a first terminal 212a coupled to node 210a and a second terminal 212b coupled to a reference potential (here, ground or GND). Resistance values of the resistors $R_1$, $R_2$ may be selected to achieve a desired divided voltage $V_{DIV}$, which divided voltage $V_{DIV}$ is coupled to the first buffer 220. In particular, resistance values of the resistors $R_1$, $R_2$ may be selected to divide the input voltage $V_{IN}$ by an amount sufficient to allow lower voltage rated components to be used in the control circuit 200, particularly in applications in which the input voltage $V_{IN}$ can vary significantly, such as in automotive applications in which the input voltage can vary between about 10V and 60V. Resistors $R_1$ and $R_2$ may be selected to have relatively large resistance values in order to reduce static current drawn from the input voltage $V_{IN}$.

The first buffer 220 may be a unity gain buffer configured to provide a buffered voltage at a buffer output 220c in response to the divided voltage $V_{DIV}$. The first capacitor 230 has a first terminal coupled to the buffer output 220c and a second terminal 230b, and a feedforward current $I_{FFWD}$ flows through capacitor 230 when there is a variation (i.e., a positive or negative transient) in the input voltage $V_{IN}$. More particularly, as will be described, under relatively steady state input voltage conditions there will be no current flow through capacitor 230 because there is no voltage drop across its terminals 230a, 230b. However, when the input voltage $V_{IN}$ varies by more than a predetermined amount (i.e., experiences a predetermined positive or negative variation, referred to herein alternatively as the occurrence of a positive or negative input voltage transient), then current $I_{FFWD}$ is generated. More particularly, if the input voltage transient is positive (i.e., the input voltage rises), then the feedforward current $I_{FFWD}$ flows from the buffer output 220c to the current mirror circuit 240; whereas if the input voltage transient is negative (i.e., the input voltage falls), then the feedforward current $I_{FFWD}$ flows from the current mirror circuit 240 to the buffer output 220c. Buffer 220 separates resistors $R_1$ and $R_2$ from capacitor 230, thereby advantageously reducing the time constant associated with the feedforward current $I_{FFWD}$.

The current mirror circuit 240 has a first current path 241 coupled to the second capacitor terminal 230b and to a first reference current source 243 and a second current path 244 coupled to a second reference current source 246. Additionally, the current mirror circuit 240 has a current mirror output node 240c at which a current mirror output voltage ($V_{RAMP}$) indicative of the input voltage variation is generated. In embodiments, the first reference current source 243 and the second reference current source 246 are a same reference current source (i.e., the first current path and the second current path are coupled to a same current source), or at least provide substantially the same current level.

In the illustrated embodiment, the first current path 241 includes a first transistor 242 and the second current path 244 includes a second transistor 245. First transistor 242 (e.g., a FET) of the first current path 241 has a first terminal 242a (e.g., a source terminal) coupled to a node 240a of the current mirror circuit 240, which node 240a is coupled to the second terminal 230b of the first capacitor 230 and to the first reference current source 243. First transistor 242 also has a second, control terminal 242b (e.g., a gate terminal) coupled to a node 240b of the current mirror circuit 240, which node 240b is coupled to node 240a of the current mirror circuit 240. Additionally, first transistor 242 has a third terminal 242c (e.g., a drain terminal) coupled a reference potential (here, GND).

Second transistor 245 (e.g., a FET) of the second current path 244 has a first terminal 245a (e.g., a source terminal) coupled to a node 240c of the current mirror circuit 240 at which a current mirror output voltage indicative of a variation of the input voltage $V_{IN}$ is generated, and coupled to the second reference current source 246. Additionally, second transistor 245 has a second, control terminal 245b (e.g., a gate terminal) coupled to node 240b and a third terminal 245c (e.g., a drain terminal) coupled to the reference potential.

A second capacitor 250 has a first terminal 250a coupled to a node 200b of the control circuit 200, which node 200b is coupled to node 240c of the second current path at which the current mirror output voltage is generated. The second capacitor 250 also has a second terminal 250b coupled to a reference potential, here GND. The current mirror output voltage is generated across the second capacitor 250.

In operation, if no feedforward current $I_{FFWD}$ flows (i.e., as will occur when the input voltage level $V_{IN}$ is relatively constant), then the same current provided by both of the current sources 243, 246 flows through the first and second current mirror circuit paths 241, 244. As a result, the voltage at nodes 240a and 240c will remain unchanged. If however, a positive input voltage transient occurs, causing a feedforward current $I_{FFWD}$ to flow into current mirror node 240a, then the voltage at node 240a will rise and the voltage at current mirror output node 240c will fall accordingly. The falling voltage at current mirror output node 240c discharges the capacitor 250 causing the voltage across capacitor 250 to fall and this decrease in the current mirror output voltage $V_{RAMP}$ will be sensed by the digitizing circuit 260 to provide an indication of the positive input voltage transient via the feedforward control signal PT. Conversely, if a negative input voltage transient occurs causing a feedforward current $I_{FFWD}$ to flow out of current mirror node 240a to the buffer output 220c, then the voltage at node 240a will fall and the voltage at current mirror output node 240c will rise accordingly. The rising voltage at current mirror output node 240c causes the capacitor 250 to charge and this increase in the current mirror output voltage $V_{RAMP}$ will be sensed by the digitizing circuit 260 to provide an indication of the negative input voltage transient via the feedforward control signal NT. With the above explanation, it will be apparent that the same current that flows through capacitor 230 flows through capacitor 250, but with opposition polarity.

In embodiments, the first capacitor 230 has a first capacitance value and the second capacitor 250 has a second capacitance value that is substantially different from the first capacitance value. In embodiments, the first and second capacitance values are selected such that the current mirror output voltage generated at nodes 240c, 200b changes at a substantially same rate as the input voltage $V_{IN}$. More particularly, since an equal but opposite polarity current flows through capacitor 250 as flows through capacitor 230, and since both capacitors 230, 250 are affected by the same rate of change of the input voltage $dV_{IN}/dt$, the rate of change of the voltage across both capacitors will be the same (albeit the rate of change of the voltage across capacitor 230 will be $+dV_{IN}/dt$ and the rate of change of the voltage across capacitor 250 will be $-dV_{IN}/dt$). As one of various examples, capacitor 230 may have a capacitance value of 50 pF and capacitor 250 may have a capacitance value of 5 pF.

The digitizing circuit 260, which is illustrative of one example configuration of a digitizing circuit according to the disclosure, includes a second divider 270, a first comparator 280 and a second comparator 290.

The second divider 270 of the digitizing circuit 260 includes a resistor ladder having a plurality of series-coupled resistors (here, resistors $R_3$, $R_4$, $R_5$, $R_6$). The divider 270 is coupled between a bandgap reference voltage $V_{BG}$ and a reference potential, such as GND and has intermediate nodes 270a, 270b at which reference, or threshold voltages V+, V− are provided, respectively.

In some embodiments, the first threshold voltage V+ has a first voltage value and the second threshold voltage V− has a second voltage value that is different from the first voltage value. In other embodiments, the first voltage value of the first threshold voltage V+ is substantially similar to the second voltage value of the second threshold voltage V−. The first and second threshold voltages V+, V− establish the negative and positive input voltage variations at which the feedforward control signal (or more particular, respective feedforward control signals NT, PT) transitions to indicate a negative or positive input voltage variation, respectively.

The first comparator 280 is coupled to current mirror output node 240c (e.g., a level-shifted voltage) at a first comparator input (e.g., a non-inverting input) and is also coupled to receive the first threshold voltage V+ at a second comparator input (e.g., an inverting input) and is configured to generate a first comparison signal NT at an output 200c. The first comparison signal NT, which corresponds to a first feedforward control signal, may be indicative of a negative transient of the input voltage $V_{IN}$ when the current mirror output voltage is less than the first threshold voltage.

The second comparator 290 is coupled to the current mirror output node 240c at a first comparator input (e.g., an inverting input) and is also coupled to receive the second threshold voltage V− at a second comparator input (e.g., a non-inverting input) and is configured to generate a second comparison signal PT at an output 200d. The second comparison signal PT, which corresponds to a second feedforward control signal, may be indicative of a positive transient of the input voltage $V_{IN}$ when the current mirror output voltage is greater than the second threshold voltage.

In operation, when a positive input voltage transient occurs, causing a feedforward current $I_{FFWD}$ to flow into current mirror node 240a and the voltage at node 240a to rise, the current mirror output voltage $V_{RAMP}$ will fall and when $V_{RAMP}$ hits the threshold voltage V−, the output 200d of comparator 290 will trip generating logic bit PT to indicate the positive input voltage transient. Conversely, when a negative input voltage transient occurs, causing a feedforward current $I_{FWWD}$ to flow out of current mirror node 240a and the voltage at node 240a to fall, the current mirror output voltage $V_{RAMP}$ will rise and when $V_{RAMP}$ hits the threshold voltage V+, the output 200c of comparator 280 will trip generating logic bit NT to indicate the negative input voltage transient.

Mismatches between the first and second current mirror paths 241, 244 may lead to drift in the current mirror output voltage $V_{RAMP}$ over time. Accordingly, control circuit 200 may include a reset circuit 1210 to counteract this issue. The reset circuit 1210, which is illustrative of one example configuration of a reset circuit, includes a logic gate 1212, a second buffer 1214 and a switch 1216.

The logic gate 1212 is coupled to receive the first comparison signal NT at a first logic gate input 1212a, the second comparison signal PT at a second logic gate input 1212c, and a reset signal at a third logic gate input 1212b and is configured to generate an output signal at logic gate output 1212d, which signal is used to control operation of the switch 1216, as will be further discussed below.

Switch 1216 is coupled between the current mirror output 240c and an output of buffer 1214, as shown. The buffer 1214 is coupled to receive a third threshold voltage Vnom and is configured to reset the current mirror output voltage at node 240c to the threshold voltage Vnom when switch 1216 is closed.

The reset circuit 1210 is configured to periodically reset the current mirror output voltage at node 240c to a predetermined level, here Vnom. In one example configuration, the switch 1216 is closed to reset the current mirror output voltage after a predetermined number of cycles of a system clock signal (in response to the Reset signal) and also after the occurrence of positive logic bits PT and negative logic bits NT by operation of the OR gate 1212. Example operation of a control circuit according to the disclosure (e.g., 200, shown in FIG. 2) and the reset functionality is described further below in connection with FIG. 3. As will be apparent, because the current mirror output voltage level $V_{RAMP}$ is reset at periodic intervals, certain, relatively slower input voltage variations may not be detected since the voltage on capacitor 250 may not be able to reach the threshold voltage V+ and V− before it is reset to Vnom. However, generally, the feedback path 130 (FIG. 1) is designed to detect such slower input voltage transients.

It is to be appreciated that the feedforward control circuit 200 described above is but one of many potential configurations of feedforward control circuits in accordance with the concepts, systems, circuits and techniques described herein. As one example, while the digitizing circuit 260 of the control circuit 200 is shown and described herein as including first and second comparators 280, 290 to generate respective comparison signals indicative of negative and positive transients of the input voltage $V_{IN}$, respectively, in some embodiments the digitizing circuit 260 can alternatively include more than two comparators and/or other circuitry (e.g., multi-bin ADCs), for example, to detect more subtle changes in the input voltage $V_{IN}$ (and the current mirror output voltage $V_{RAMP}$ to which the digitizing circuit 260 is responsive).

Figure 3:
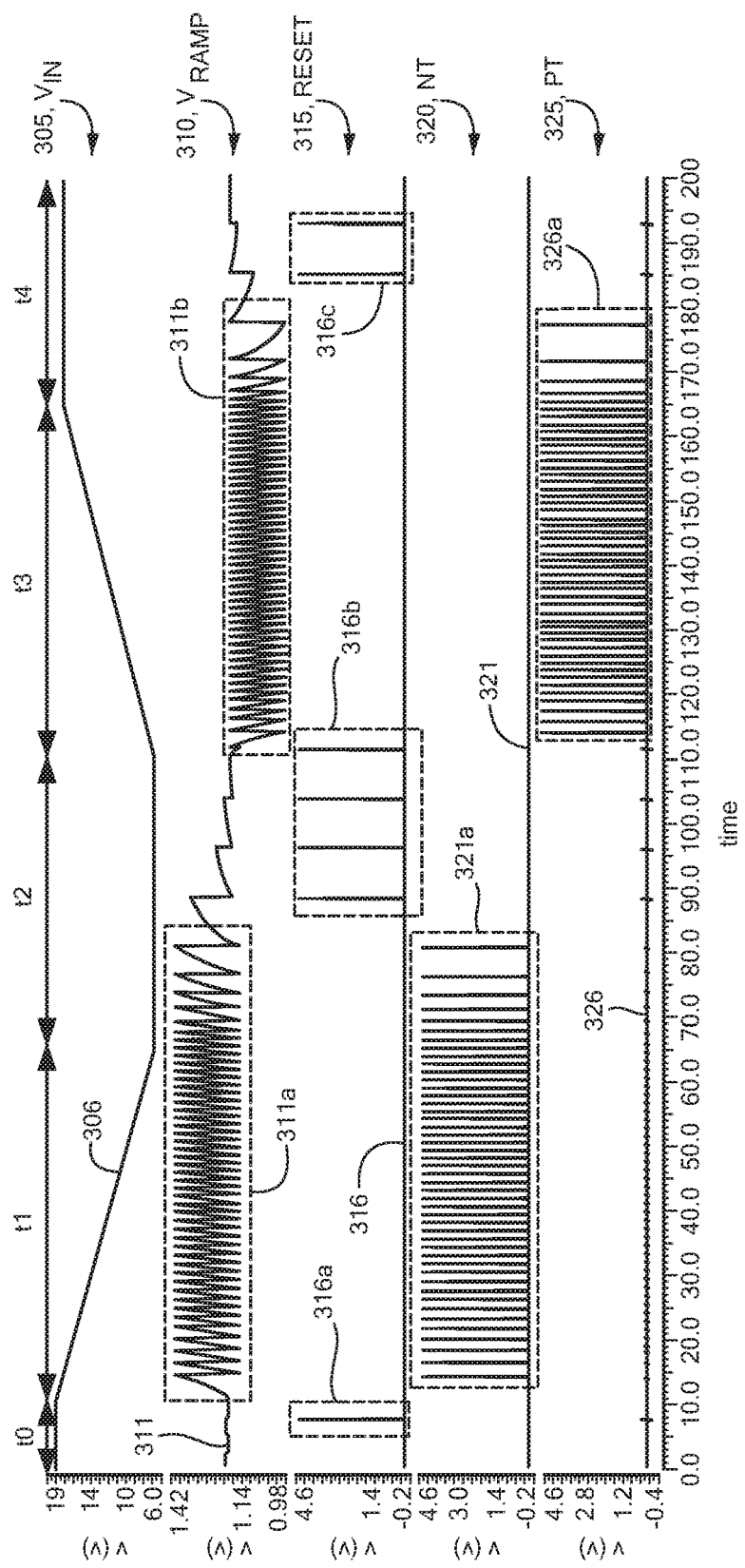
FIG. 3 shows illustrative signal waveforms of various example input and output signals of the control circuit of FIG. 2.

Referring to FIG. 3, illustrative signal waveforms of various input and output signals of a control circuit, which can be the same as or similar to feedforward control circuit 200 shown in FIG. 2, are shown in a plurality of plots (305, 310, 315, 320, 325) having a horizontal axis with a scale in time units and a vertical axis with a scale in units of volts (V). Plot 305 includes a signal 306 representative of input voltage $V_{IN}$ and plot 310 includes a signal 311 representative of a current mirror output voltage $V_{RAMP}$ as may be generated at a current mirror output node (e.g., node 240c, shown in FIG. 2). Plot 315 includes a signal 316 representative of a reset signal as may be provided to an input 1212b of logic gate 1212 (FIG. 2) of the control circuit, plot 320 includes a signal 321 representative of a feedforward control signal NT indicative of a negative transient of the input voltage $V_{IN}$, and plot 325 includes a signal 326 representative of a feedforward control signal PT indicative of a positive transient of the input voltage $V_{IN}$.

As illustrated, signal levels of the current mirror output voltage 311 vary in response to a signal level of the input voltage $V_{IN}$ signal 306. As is also illustrated, the current mirror output voltage 311 is periodically reset in response to the reset signal 316 when there are no input voltage transients present, shown in plot 315.

More particularly, during a first time period t0, the input voltage $V_{IN}$ signal 306 is at a first steady state voltage level (i.e., there is no transient). Since no feedforward current $I_{FFWD}$ flows through capacitor 230 under this steady state input voltage condition, current mirror output voltage 311 also remains substantially constant. Additionally, after a predetermined amount of time during the first time period t0 in which no transient in the input voltage $V_{IN}$ signal 306 is detected by the control circuit, a reset pulse 316a of the reset signal 316 resets the current mirror output voltage 311 to a predetermined level, such as $V_{nom}$ (FIG. 2).

During a second time period t1, the input voltage $V_{IN}$ signal 306 decreases from the first voltage level to a second voltage level that is substantially less than the first voltage level. In response thereto, the current mirror output voltage 311 increases, causing the comparator 280 (FIG. 2) to trip and generate the negative transient signal 321 including a plurality of negative logic bits NT 321a indicative of the negative transient of the input voltage $V_{IN}$ 306. More particularly, each time the comparator 280 trips, generating an NT pulse or logic bit, the $V_{RAMP}$ voltage 311 is reset (via the NT input to logic gate 1212 of FIG. 2). It will be appreciated that the number of negative logic bits NT provides an indication of the magnitude of the negative input voltage transient.

During a third time period t2, the input voltage $V_{IN}$ signal 306 remains substantially constant, thereby resulting in no feedforward current flow $I_{FFWD}$ through capacitor 230 and no change in the voltage across capacitor 250 (i.e., $V_{RAMP}$). After a predetermined amount of time during the third time period t2 in which no transient in the input voltage $V_{IN}$ signal 306 is detected by the control circuit, reset pulses 316b of the reset signal 316 reset the current mirror output voltage 311 to a predetermined voltage level, such as $V_{nom}$ (FIG. 2).

During a fourth time period t3, the input voltage $V_{IN}$ signal 306 increases from the second voltage level to a third voltage level that is substantially greater than the second voltage level. In response thereto, current mirror output voltage 311 decreases, causing the comparator 290 (FIG. 2) to trip and generate the positive transient signal 326 including a plurality of positive logic bits PT 326a indicative of the positive transient of the input voltage $V_{IN}$ signal 306. More particularly, each time the comparator 290 trips, generating a PT pulse or logic bit, the $V_{RAMP}$ voltage 311 is reset (via the PT input to logic gate 1212 of FIG. 2). It will be appreciated that the number of positive logic bits PT provides an indication of the magnitude of the positive input voltage transient.

During a fifth time period t4, the input voltage $V_{IN}$ signal 306 remains substantially constant, again resulting in no feedforward current flow $I_{FFWD}$ through capacitor 230 and no change in the voltage across capacitor 250 (i.e., $V_{RAMP}$). Additionally, after a predetermined amount of time during the fifth time period t4 in which no transient in the input voltage $V_{IN}$ signal 306 is detected by the control circuit, reset pulses 316c of the reset signal 316 reset the current mirror output voltage 311 to a predetermined voltage level, such as $V_{nom}$ (FIG. 2).

As described above and as will be appreciated by those of ordinary skill in the art, embodiments of the disclosure herein may be configured as a system, method, or combination thereof. Accordingly, embodiments of the present disclosure may be comprised of various means including hardware, software, firmware or any combination thereof.

Having described preferred embodiments, which serve to illustrate various concepts, structures and techniques, which are the subject of this patent, it will now become apparent to those of ordinary skill in the art that other embodiments incorporating these concepts, structures and techniques may be used. Additionally, elements of different embodiments described herein may be combined to form other embodiments not specifically set forth above.

Accordingly, it is submitted that that scope of the patent should not be limited to the described embodiments but rather should be limited only by the spirit and scope of the following claims.

What is claimed is:

1. A control circuit for generating a feedforward control signal based on an input voltage, comprising:
a divider coupled to the input voltage to generate a divided voltage having a value that is a fraction of the input voltage;
a first buffer responsive to the divided voltage to generate a buffered voltage at an output of the first buffer;
a first capacitor coupled to the first buffer output and configured to generate a feedforward current when there is a variation in the input voltage;
a current mirror circuit comprising a first current path coupled to the first capacitor and to a reference current source and a second current path coupled to the reference current source and comprising a current mirror output node at which a current mirror output voltage indicative of the input voltage variation is generated; and
a digitizing circuit responsive to the current mirror output voltage to generate the feedforward control signal, wherein the digitizing circuit comprises:
a first comparator responsive to the current mirror output voltage and to a first threshold signal to generate a first comparison signal indicative of a negative transient of the input voltage when the current mirror output voltage is greater than the first threshold signal; and
a second comparator responsive to the current mirror output voltage and to a second threshold signal to generate a second comparison signal indicative of a positive transient of the input voltage when the current mirror output voltage is less than the second threshold signal, wherein the feedforward control signal comprises configuration of the first comparison signal and the second comparison signal.

2. The control circuit of claim 1, further comprising a second capacitor coupled to the second current path of the current mirror, wherein the current mirror output voltage is generated across the second capacitor.

3. The control circuit of claim 2, wherein the first capacitor has a first capacitance value and the second capacitor has a second capacitance value that is different from the first capacitance value, and wherein the first and second capacitance values are selected such that the current mirror output voltage changes at a substantially same rate as the input voltage.

4. The control circuit of claim 1, wherein the first current path of the current mirror circuit comprises a first transistor having a first terminal coupled to the first capacitor, a second, control terminal, and a third terminal coupled to a reference potential, and wherein the second current path of the current mirror circuit comprises a second transistor having a first terminal coupled to the current mirror output node, a second, control terminal, and a third terminal coupled to the reference potential, wherein the control terminal of the first transistor is coupled to the control terminal of the second transistor.

5. The control circuit of claim 1, wherein the first threshold signal has a first voltage value and the second threshold signal has a second voltage value that is substantially different from the first voltage value.

6. The control circuit of claim 1, wherein the feedforward control signal is coupled to a digital compensator of a DC-DC converter.

7. The control circuit of claim 6, wherein the DC-DC converter is a buck regulator.

8. The control circuit of claim 1, further comprising a reset circuit configured to periodically reset the current mirror output voltage to a predetermined level.

9. The control circuit of claim 8, wherein the reset circuit comprises a second buffer responsive to a third threshold signal to generate a reset signal to reset the current mirror output voltage.

10. The control circuit of claim 9, further comprising a switch coupled between an output of the second buffer and the second capacitor and wherein the reset signal is coupled to a control terminal of the switch.

11. The control circuit of claim 10, wherein the switch is closed to reset the current mirror output voltage after a predetermined number of cycles of a system clock signal.

12. A DC-DC converter, comprising:
a power stage responsive to an input voltage and to a voltage control signal and configured to generate a regulated output voltage having a level that varies in response to the voltage control signal;
a control circuit for generating the voltage control signal, comprising:
a feedforward path, comprising:
a first divider coupled to the input voltage to generate a first divided voltage having a value that is a fraction of the input voltage;
a first buffer responsive to the first divided voltage to generate a buffered voltage at an output of the first buffer;
a first capacitor coupled to the first buffer output and configured to generate a feedforward current when there is a variation in the input voltage;
a current mirror circuit comprising a first current path coupled to the first capacitor and to a reference current source and a second current path coupled to the reference current source and comprising a current mirror output node at which a current mirror output voltage indicative of the input voltage variation is generated;
a digitizing circuit responsive to the current mirror output voltage to generate a feedforward control signal; and
a reset circuit configured to periodically reset the current mirror output voltage to a predetermined level, wherein the reset circuit comprises a second buffer responsive to a third threshold signal to generate a reset signal to reset the current mirror output voltage;
a feedback path, comprising:
a second divider coupled to the regulated output voltage to generate a second divided voltage having a value that is a fraction of the regulated output voltage;
an error amplifier responsive to the second divided voltage and to a reference voltage to generate an error voltage indicative of a difference between the second divided voltage and the reference voltage;
an ADC responsive to the error voltage to generate a feedback control signal;
a digital compensator responsive to the feedforward control signal and to the feedback control signal to generate a compensator signal; and
a pulse width modulator responsive to the compensator signal to generate the voltage control signal.

13. A method for generating a feedforward control signal based on an input voltage in a control circuit, comprising:
dividing the input voltage to generate a divided voltage having a value that is a fraction of the input voltage;
generating a buffered voltage at an output of a first buffer in response to the divided voltage;
generating a feedforward current through a first capacitor coupled to the first buffer output when there is a variation in the input voltage;
coupling a first current path of a current mirror circuit to the first capacitor and to a reference current source and coupling a second current path of the current mirror circuit to the reference current source;
generating a current mirror output voltage indicative of the input voltage variation at an output node of the current mirror circuit in the second current path, the current mirror output voltage being generated in response to the feedforward current and to a reference current received from the reference current source; and
generating the feedforward control signal in response to the current mirror output voltage; and
periodically resetting the current mirror output voltage to a predetermined level, wherein the reset circuit comprises a second buffer responsive to a third threshold signal to generate a reset signal to reset the current mirror output voltage.

14. A control circuit for generating a feedforward control signal based on an input voltage, comprising:
means for dividing the input voltage to generate a divided voltage having a value that is a fraction of the input voltage;
a first buffer responsive to the divided voltage to generate a buffered voltage at an output of the first buffer;
means for generating a feedforward current from the first buffer output when there is a variation in the input voltage;

a current mirror circuit comprising a first current path coupled to a reference current source and to the means for generating the feedforward current and a second current path coupled to the reference current source and comprising a current mirror output node at which a current mirror output voltage indicative of the input voltage variation is generated; and means for generating the feedforward control signal in response to the current mirror output voltage, wherein the means for generating the feedforward control signal comprises:
  a first comparator responsive to the current mirror output voltage and to a first threshold signal to generate a first comparison signal indicative of a negative transient of the input voltage when the current mirror output voltage is greater than the first threshold signal; and
  a second comparator responsive to the current mirror output voltage and to a second threshold signal to generate a second comparison signal indicative of a positive transient of the input voltage when the current mirror output voltage is less than the second threshold signal, wherein the feedforward control signal comprises configuration of the first comparison signal and the second comparison signal.

15. The control circuit of claim 14, wherein the first threshold signal has a first voltage value and the second threshold signal has a second voltage value that is substantially different from the first voltage value.

16. The control circuit of claim 14, wherein the feedforward control signal is coupled to a digital compensator of a DC-DC converter.

17. The control circuit of claim 14, further comprising a reset circuit configured to periodically reset the current mirror output voltage to a predetermined level.

18. The control circuit of claim 17, wherein the reset circuit comprises a second buffer responsive to a third threshold signal to generate a reset signal to reset the current mirror output voltage.

19. A control circuit for generating a feedforward control signal based on an input voltage, comprising:
  a divider coupled to the input voltage to generate a divided voltage having a value that is a fraction of the input voltage;
  a first buffer responsive to the divided voltage to generate a buffered voltage at an output of the first buffer;
  a first capacitor coupled to the first buffer output and configured to generate a feedforward current when there is a variation in the input voltage;
  a current mirror circuit comprising a first current path coupled to the first capacitor and to a reference current source and a second current path coupled to the reference current source and comprising a current mirror output node at which a current mirror output voltage indicative of the input voltage variation is generated;
  a digitizing circuit responsive to the current mirror output voltage to generate the feedforward control signal; and
  a reset circuit configured to periodically reset the current mirror output voltage to a predetermined level, wherein the reset circuit comprises a second buffer responsive to a third threshold signal to generate a reset signal to reset the current mirror output voltage.

20. A DC-DC converter, comprising:
  a power stage responsive to an input voltage and to a voltage control signal and configured to generate a regulated output voltage having a level that varies in response to the voltage control signal;
  a control circuit for generating the voltage control signal, comprising:
    a feedforward path, comprising:
      a first divider coupled to the input voltage to generate a first divided voltage having a value that is a fraction of the input voltage;
      a first buffer responsive to the first divided voltage to generate a buffered voltage at an output of the first buffer;
      a first capacitor coupled to the first buffer output and configured to generate a feedforward current when there is a variation in the input voltage;
      a current mirror circuit comprising a first current path coupled to the first capacitor and to a reference current source and a second current path coupled to the reference current source and comprising a current mirror output node at which a current mirror output voltage indicative of the input voltage variation is generated; and
      a digitizing circuit responsive to the current mirror output voltage to generate a feedforward control signal, wherein the digitizing circuit comprises:
        a first comparator responsive to the current mirror output voltage and to a first threshold signal to generate a first comparison signal indicative of a negative transient of the input voltage when the current mirror output voltage is greater than the first threshold signal; and
        a second comparator responsive to current mirror output voltage and to a second threshold signal to generate a second comparison signal indicative of a positive transient of the input voltage when the current mirror output voltage is less than the second threshold signal, wherein the feedforward control signal comprises configuration of the first comparison signal and the second comparison signal;
    a feedback path, comprising:
      a second divider coupled to the regulated output voltage to generate a second divided voltage having a value that is a fraction of the regulated output voltage;
      an error amplifier responsive to the second divided voltage and to a reference voltage to generate an error voltage indicative of a difference between the second divided voltage and the reference voltage;
      an ADC responsive to the error voltage to generate a feedback control signal;
    a digital compensator responsive to the feedforward control signal and to the feedback control signal to generate a compensator signal; and
    a pulse width modulator responsive to the compensator signal to generate the voltage control signal.

21. A method for generating a feedforward control signal based on an input voltage in a control circuit, comprising:
  dividing the input voltage to generate a divided voltage having a value that is a fraction of the input voltage;
  generating a buffered voltage at an output of a first buffer in response to the divided voltage;
  generating a feedforward current through a first capacitor coupled to the first buffer output when there is a variation in the input voltage;
  coupling a first current path of a current mirror circuit to the first capacitor and to a reference current source and coupling a second current path of the current mirror circuit to the reference current source;

generating a current mirror output voltage indicative of the input voltage variation at an output node of the current mirror circuit in the second current path, the current mirror output voltage being generated in response to the feedforward current and to a reference current received from the reference current source;

generating the feedforward control signal in response to the current mirror output voltage;

generating a first comparison signal, by a first comparator of a digitizing circuit that is responsive to the current mirror circuit and to a first threshold signal, the first comparison signal indicative of a negative transient of the input voltage when the current mirror output voltage is greater than the first threshold signal; and generating a second comparison signal, by a second comparator of a digitizing circuit that is responsive to the current mirror output voltage and to a second threshold signal, the second comparison signal indicative of a positive transient of the input voltage when the current mirror output voltage is less than the second threshold signal, wherein the feedforward control signal comprises configuration of the first comparison signal and the second comparison signal.

22. A control circuit for generating a feedforward control signal based on an input voltage, comprising:

means for dividing the input voltage to generate a divided voltage having a value that is a fraction of the input voltage;

a first buffer responsive to the divided voltage to generate a buffered voltage at an output of the first buffer;

means for generating a feedforward current from the first buffer output when there is a variation in the input voltage;

a current mirror circuit comprising a first current path coupled to a reference current source and to the means for generating the feedforward current and a second current path coupled to the reference current source and comprising a current mirror output node at which a current mirror output voltage indicative of the input voltage variation is generated;

means for generating the feedforward control signal in response to the current mirror output voltage; and a reset circuit configured to periodically reset the current mirror output voltage to a predetermined level, wherein the reset circuit comprises a second buffer responsive to a third threshold signal to generate a reset signal to reset the current mirror output voltage.

\* \* \* \* \*

UNITED STATES PATENT AND TRADEMARK OFFICE
CERTIFICATE OF CORRECTION

PATENT NO. : 10,386,882 B2
APPLICATION NO. : 15/487746
DATED : August 20, 2019
INVENTOR(S) : Kapil Kesarwani Page 1 of 1

It is certified that error appears in the above-identified patent and that said Letters Patent is hereby corrected as shown below:

On the Title Page

Item (71) delete "Worcester, MA" and replace with --Manchester, NH--.

In the Specification

Column 2, Line 60 delete "an current mirror" and replace with --a current mirror--.

Signed and Sealed this
Twenty-third Day of June, 2020

Andrei Iancu
*Director of the United States Patent and Trademark Office*